(12) United States Patent
Bhalerao et al.

(10) Patent No.: US 11,570,193 B2
(45) Date of Patent: Jan. 31, 2023

(54) MALWARE PROPAGATION RISK ASSESSMENT IN SOFTWARE DEFINED NETWORKS

(71) Applicant: VMWARE, INC., Palo Alto, CA (US)

(72) Inventors: Anand Jaysingh Bhalerao, Pune (IN); Aneri Rajiv Desai, Pune (IN); Dashmeet Kaur Ajmani, Pune (IN)

(73) Assignee: VMware, Inc., Palo Alto, CA (US)

( * ) Notice: Subject to any disclaimer, the term of this patent is extended or adjusted under 35 U.S.C. 154(b) by 330 days.

(21) Appl. No.: 16/698,989

(22) Filed: Nov. 28, 2019

(65) Prior Publication Data

US 2021/0092145 A1    Mar. 25, 2021

(30) Foreign Application Priority Data

Sep. 20, 2019 (IN) .............................. 201941037953

(51) Int. Cl.
*H04L 9/40* (2022.01)
*H04L 45/48* (2022.01)
*G06F 9/455* (2018.01)

(52) U.S. Cl.
CPC ...... *H04L 63/1433* (2013.01); *G06F 9/45558* (2013.01); *H04L 45/48* (2013.01); *H04L 63/1425* (2013.01); *G06F 2009/45595* (2013.01)

(58) Field of Classification Search
USPC ........................................................ 726/25
See application file for complete search history.

(56) References Cited

U.S. PATENT DOCUMENTS

| | | | |
|---|---|---|---|
| 9,178,807 B1 * | 11/2015 | Chua ........................ | H04L 45/02 |
| 2005/0050350 A1 * | 3/2005 | Cain ................... | H04L 63/1433 |
| | | | 726/4 |
| 2006/0130142 A1 * | 6/2006 | Mester .................. | H04L 51/212 |
| | | | 726/23 |
| 2007/0061487 A1 * | 3/2007 | Moore .................... | G06F 16/27 |
| | | | 707/E17.032 |

(Continued)

FOREIGN PATENT DOCUMENTS

| CN | 102984140 | * | 3/2013 |
|---|---|---|---|
| CN | 102984140 A | * | 3/2013 |
| CN | 109995740 A | * | 7/2019 |

OTHER PUBLICATIONS

Dourado et al, "Design of connection networks with bounded number of non-terminal vertices", (Apr. 9, 2014), Sociedade Brasileira de Matematica, Matematica Contemporanea, vol. 42, 39-48 (Year: 2014).*

(Continued)

*Primary Examiner* — Sakinah White Taylor (57) ABSTRACT

Described herein are systems, methods, and software to identify propagation risk of threats in a computing environment. In one implementation, a management service may identify a connection tree for a computing environment based on forwarding rules for virtual nodes in the computing environment. The management service may further, for each connection in the connection tree, determine a threat value based at least on a protocol associated with the connection. The management service may also identify a threat to a virtual node of the virtual nodes and generate a threat propagation summary for the threat based on the one or more minimum or maximum spanning trees.

20 Claims, 7 Drawing Sheets

(56) References Cited

U.S. PATENT DOCUMENTS

| | | | |
|---|---|---|---|
| 2013/0339545 A1* | 12/2013 | Shenoi | H04L 47/24 709/240 |
| 2016/0012560 A1* | 1/2016 | Johnson | G06Q 50/265 705/325 |
| 2017/0214702 A1* | 7/2017 | Moscovici | H04W 12/106 |
| 2018/0198805 A1* | 7/2018 | Vejman | G06N 5/022 |
| 2019/0147161 A1* | 5/2019 | Agarwal | G06F 30/20 726/23 |
| 2019/0164092 A1* | 5/2019 | Argyros | G06F 3/0482 |
| 2020/0052997 A1* | 2/2020 | Ramanathan | H04W 4/06 |
| 2020/0412758 A1* | 12/2020 | Trivellato | H04L 63/1441 |

OTHER PUBLICATIONS

Tripathy et al, "Risk based Security Enforcement in Software Defined Network", (Jul. 31, 2018), Elsevier, ScienceDirect, Computers & Security 78, 321-335 (Year: 2018).*

* cited by examiner

MALWARE PROPAGATION RISK ASSESSMENT IN SOFTWARE DEFINED NETWORKS

RELATED APPLICATIONS

Benefit is claimed under 35 U.S.C. 119(a)-(d) to Foreign Application Serial No. 201941037953 filed in India entitled "MALWARE PROPAGATION RISK ASSESSMENT IN SOFTWARE DEFINED NETWORKS", on Sep. 20, 2019, by VMWARE, INC., which is herein incorporated in its entirety by reference for all purposes.

TECHNICAL BACKGROUND

Software defined networks include logical entities that provide various networking operations for computing elements, such as virtual machines and containers. The networking operations may include routing operations, switching operations, firewall operations, or some other networking operations. To implement the networking operations, a networking controller or manager may be required to distribute software defined networking configuration data to various computing elements. This configuration data may include objects such as forwarding rules that can indicate limitations on how computing elements are permitted to communicate. These forwarding rules may indicate that packets are permitted to be communicated, may indicate that packets are blocked from being communicated, may indicate that packets are to be modified prior to communication, or may indicate any other similar operation with respect to the packets in a computing environment.

However, as computing environments become more complex with additional computing elements and configuration data for the software defined networks, it may become difficult to identify how threats, such as malware or viruses, can be propagated through a computing environment. This complexity can cause difficulties in determining security measures to respond to threats in the environment, difficulties in identifying which computing elements are at the most risk, or some other difficulty associated with responding to threats in a computing environment.

SUMMARY

The technology described herein manages and identifies threat propagation risk for virtual nodes in a computing environment. In one implementation, a management service may identify a connection tree for a computing environment based on forwarding rules for virtual nodes in the computing environment. The management service may further determine a threat value for each connection in the connection tree. From the threat values, the management service may generate a threat propagation summary associated with a threat identified for a virtual node in the computing environment.

DETAILED DESCRIPTION

Figure 1:
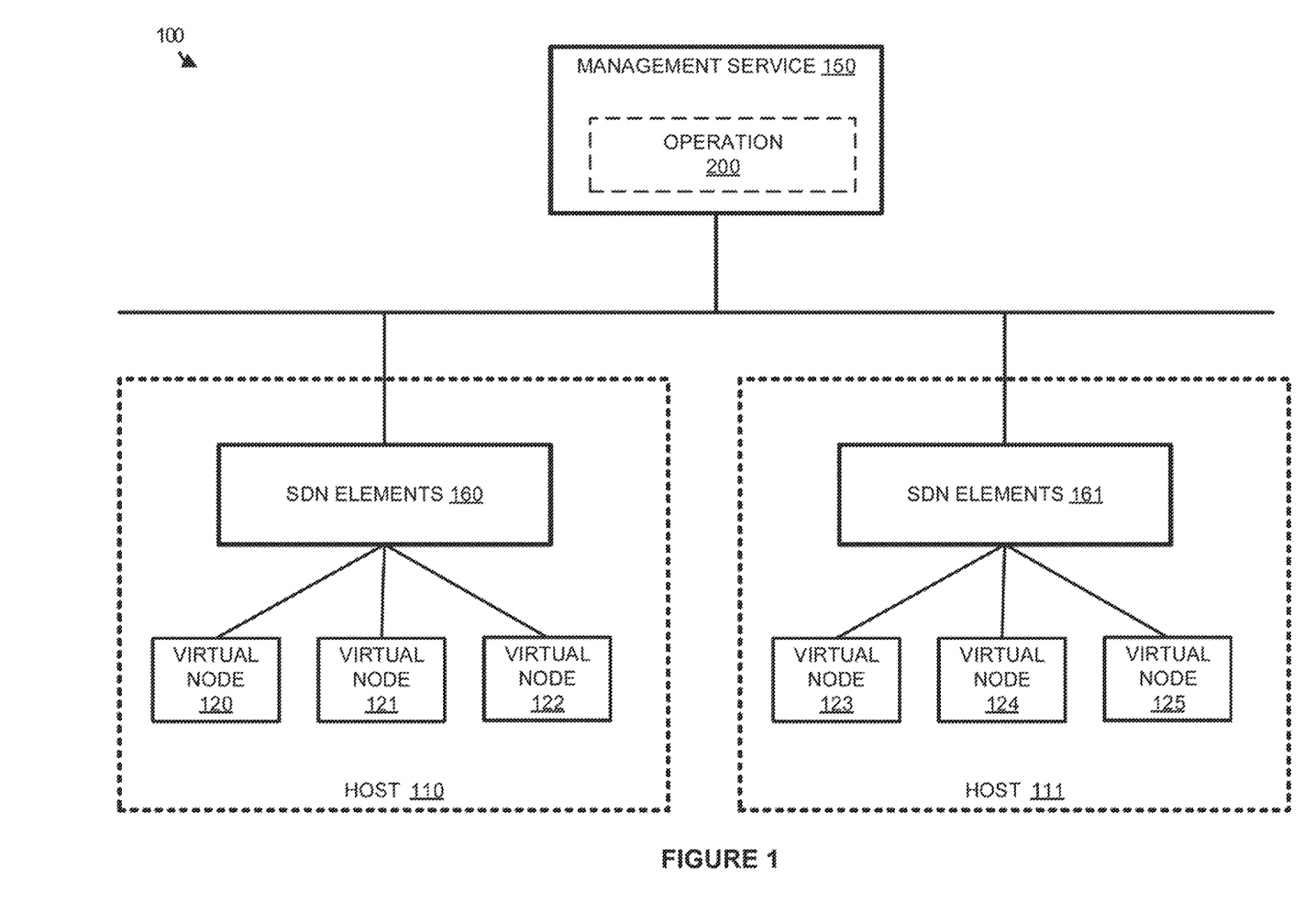
FIG. 1 illustrates a computing environment to manage risk assessment for virtual nodes according to an implementation.

FIG. 1 illustrates a computing environment 100 to manage risk assessment for virtual nodes according to an implementation. Computing environment 100 includes hosts 110-111 and management service 150. Hosts 110-111 include software defined networking (SDN) elements 160-161 and virtual nodes 120-125.

In operation, an organization deploys virtual nodes 120-125 to provide various operations, including data processing operations, front-end serving applications, database applications, virtual desktop operations, or some other operations. Virtual nodes 120-125 may comprise full operating system virtual machines, may comprise containers, or may comprise some other containerized endpoint. To support connectivity for the virtual nodes to other virtual nodes and other elements on the local or external networks, SDN elements 160-161 are provided. SDN elements 160-161 are representative of logical switches, logical routers, firewalls, or other software defined networking elements. As an illustrative example, SDN elements 160-161 may be used to provide switching connectivity between virtual nodes 120-125 across hosts 110-111.

In some implementations, virtual nodes 120-125 may be associated with forwarding rules that can be used to limit the connections that are made with each of the virtual nodes. These forwarding rules may identify a sending element (virtual node or external computing element), a receiving element (virtual node or external computing element), a protocol, an action, or some other information to determine how packets should be forwarded in association with the virtual nodes. As an illustrative example, forwarding rules may define that packets of transmission control protocol (TCP) from virtual node 124 to virtual node 120 are permitted, while any packet of any different protocol should be blocked. Thus, when a packet is obtained by one or SDN elements 160 or SDN elements 161, only packets of TCP protocol may be permitted to be exchanged from virtual node 124 to virtual node 120.

In some implementations, management service 150 may monitor the forwarding rules and configurations associated with SDN elements 160-161. This monitoring may include generating one or more trees that can be used to define the available connections between the virtual nodes, the threat associated with each of the connections, or some other information associated with the communication configurations for virtual nodes 120-125. From the trees (or other similar data structures), management service 150 may determine threat risks in the network. For example, if a malware threat were identified at virtual node 122, management service 150 may identify connections from virtual node 122 to other virtual nodes or the propagation of connections from virtual node 122 to other virtual nodes and identify virtual nodes that are at risk of obtaining or being affected by the malware.

In some examples, forwarding rules that permit a first type of protocol to be exchanged may pose a greater risk than forwarding rules that permit a second type of protocol to be exchanged. For example, a forwarding rule that permits all protocols to be communicated between two virtual nodes may provide a greater security risk than a forwarding rule that permits only universal data packets to be communicated between the virtual machines. In some examples in determining the risk associated with each of the protocols, an administrator may define the risk associated with the protocol or a particular connection. These may include numerical values, wherein higher/lower values may indicate more risk depending on the protocol. In some examples, rather than defining the risk of a connection based on user input, the risk may be assessed based on factors associated with the protocol and/or individual connection. These factors may include security measures implemented by the protocol, packet size available to the protocol, typical communication size associated with the protocol, applications associated with the individual virtual nodes, or some other factor. From these factors, management service 150 may generate a score (or value) for each of the connections that can be used to indicate the different threat risks associated with the spread of a malicious threat.

Figure 2:
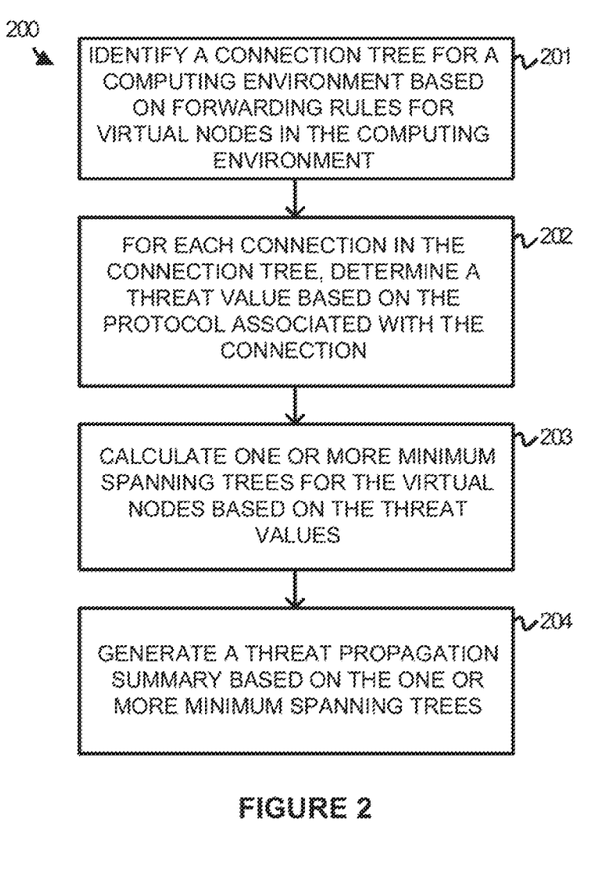
FIG. 2 illustrates an operation of a management service to identify propagation risk assessment for virtual nodes according to an implementation.

FIG. 2 illustrates an operation 200 of a management service to identify propagation risk assessment for virtual nodes according to an implementation. The processes of operation 200 are referenced parenthetically in the paragraphs that follow with reference to systems and elements of computing environment 100 of FIG. 1.

As depicted, management service 150 implements operation 200 to identify (201) a connection tree for a computing environment based on forwarding rules for virtual nodes in the computing environment. In some examples, SDN elements 160-161 may be employed by an organization to provide communication connectivity for virtual nodes 120-125 that are executing in the computing environment. SDN elements 160-161 may represent logical switches, logical routers, firewalls, or some other element of a software defined network. SDN elements 160-161 may be configured with forwarding rules that can define how each virtual node of virtual nodes 120-125 can communicate. These forwarding rules may include at least a source identifier, a destination identifier, a protocol, and an action to be taken on the packets with the identifiers and protocols. The identifiers may comprise media access control (MAC) addresses, internet protocol (IP) addresses, or some other identifier associated with a communicating packet. For example, a forwarding rule may indicate that the IP address associated with virtual node 120 may communicate with the IP address associated with virtual node 121 using TCP. From the rules, management service 150 may generate a connection tree that indicates how each of the virtual nodes within the computing environment communicate with other virtual nodes.

After a connection tree is generated for the virtual nodes, operation 200 may, for each connection in the connection tree, determine (202) a threat value based on the protocol associated with the connection. In some implementations the threat value associated with each connection may be defined by an administrator associated with the computing environment. In other implementations, management service 150 may determine the threat value associated with a connection based on a variety of factors, wherein the factors may include the size of each packet associated with a particular protocol, security measures implemented in a particular protocol, or some other information associated with a particular protocol. For example, Internet Control Message Protocol (ICMP) may have a lower threat value in relation to universal data packet (UDP) due to the size of the communications delivered by ICMP in relation to UDP. In some examples, the threat values may be determined for each protocol available for use in the forwarding rules, wherein the protocols may include TCP, UDP, ICMP, an all classification that permits all protocols, or some other protocol. In some examples, in addition to generating a threat value for each of the connections based on the protocol the threat value may be based on other factors, including the types of applications executing on the virtual nodes, the data stored on the virtual nodes, or some other factor. Here, the higher the threat value, the lower the risk associated with a particular connection, which can be used in the next operation to define the minimum spanning tree (see below at least FIGS. 4A-4B). However, it should be understood that the results may be inverse using maximum spanning trees.

Once the threat scores are identified for each of the connections in the connection tree, operation 200 may further calculate (203) one or more minimum spanning trees for the virtual nodes based on the threat values. The minimum spanning tree may be used to identify the route or routes with the largest threat to affect other virtual nodes in the computing environment, wherein the tree may be constructed using Kruskal's minimum spanning tree algorithm. For example, virtual node 120 may communicate with virtual node 122 using a standalone connection or may communicate with virtual node 122 using an intermediary virtual node, such as virtual node 121, wherein virtual node 120 may communicate with virtual node 121 and virtual node 121 may communicate with virtual node 122. Depending on the threat values associated with each of the connections, a minimum spanning tree may identify either the direct connection from virtual node 120 to virtual node 122 as the route with the largest threat to virtual node 122 or may identify the route with the intermediary virtual node 121 as the route with the largest threat to virtual node 122. For example, if the direct connection between virtual node 120 and virtual node 122 used ICMP, while the route with intermediary connections using virtual node 121 could use any protocol, the route with the intermediary connections may be identified to be used as part of the minimum spanning tree with routes from virtual node 120 to virtual node 122.

Once the one or more minimum spanning trees are calculated, operation 200 may further generate (204) a threat propagation summary based on the one or more minimum spanning trees. In some implementations, the threat propagation summary may be generated in response to an identified threat or a user defined threat for the computing environment. For example, a user may indicate a threat that exists on virtual node 120. In response to the request, management service 150 may identify a minimum spanning tree associated with the virtual node and identify one or more virtual nodes that could have the threat propagated to them based on the minimum spanning tree. The one or more nodes may be used to generate an interface that indicates possible propagation of the threat, wherein the interface may comprise a tree or some other data structure that includes the various virtual nodes. The tree or data structure may further indicate a hierarchy of the virtual nodes that could be affected by the propagation of the threat. In particular, the hierarchy may indicate the virtual nodes in descending order of risk from most at risk based on the threat values to least at risk based on the threat values. The hierarchy may also be used to eliminate or select only a subset of virtual nodes that satisfy minimum risk or propagation criteria for being affected by the threat. Any virtual nodes that satisfy the criteria may be indicated in the summary, while any virtual nodes that do not may not be provided in the summary. In some examples the threat propagation summary may be generated based on a user request, however, it should be understood that the threat propagation summary may be generated automatically when a threat is identified for a virtual node in the computing environment.

Although described in the previous example using minimum spanning trees, it should be understood that similar operations may be applied using maximum spanning trees. In particular, where the previous example indicated lower risk connections using higher threat values, management service 150 may indicate lower risk connections using lower threat values. Management service 150 may then generate one or more maximum spanning trees based on the threat values and the connection tree for the computing environment.

While demonstrated in the example of FIG. 2 as generating a summary of the propagation for an administrator or user associated with computing environment 100, management service 150 may be used to take actions to respond to threats at a virtual node in computing environment 100. In at least one example, management service 150 may identify a threat, such as a malware application executing on a virtual node, a virus, or some other threat. In response to the threat, management service 150 may identify a minimum spanning tree that corresponds to the threat and identify one or more virtual nodes at risk from the malware based on the minimum spanning tree. Once identified, management service 150 may implement one or more actions to respond to the incident, wherein the actions may include updating forwarding rules for the environment, generating a private network for one or more virtual nodes that connect with the threatened virtual node, or providing some other action. Suggestions for the one or more actions may be provided as part of the threat propagation summary to an administrator in some examples.

In at least one implementation, although the minimum or maximum spanning tree or trees may be used in determining the propagation of a threat in a computing environment, it should be understood that additional information may be supplied in a summary that corresponds to connections outside of the spanning trees. This information may include a list, graph, or other data structure that indicates all connections that could lead to a propagation of a threat in the environment. For example, although the minimum spanning trees may provide information about the largest risk for a virtual node to be affected, it should be understood that the summary may provide additional information about the other possible risks for the virtual node to be affected, such as other connection paths or routes to the virtual node with a threat.

Figure 3:
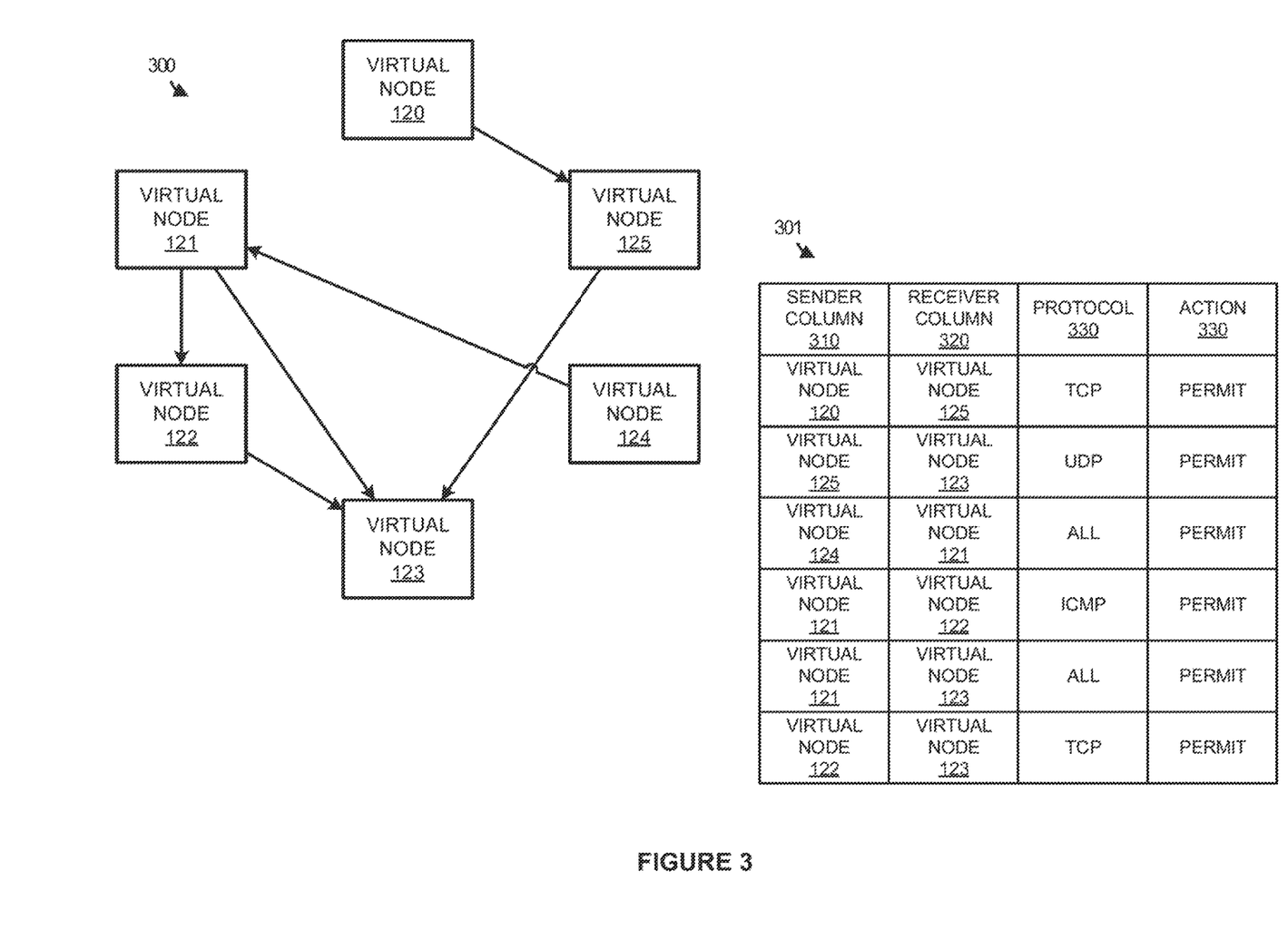
FIG. 3 illustrates an operational scenario of generating a communications connection tree for virtual nodes in a computing environment according to an implementation.

FIG. 3 illustrates an operational scenario of generating a communications connection tree for virtual nodes in a computing environment according to an implementation. FIG. 3 includes a connection tree 300 that comprises virtual nodes 120-125 from computing environment 100 of FIG. 1 with arrows representing connections available to each of the virtual nodes. FIG. 3 further includes a data structure 301 that is used to generate connection tree 300, wherein data structure 301 includes sender column 310, receiver column 320, protocol 330, and action 340.

In operation, a computing environment with virtual nodes may employ one or more software defined networks that can be used to provide network connectivity for the virtual nodes. In providing the software defined networking operations, a controller or management service may provide forwarding rules that can be used to implement the required switching, routing, and firewall operations associated with the computing environment. These forwarding rules may be used to permit communications for the virtual nodes, block communications for the virtual nodes, modify packets for the virtual nodes, or provide some other operation with respect to the communications for the virtual nodes.

Here, data structure 301 is representative of forwarding rules for computing environment 100 of FIG. 1. In particular, data structure 301 includes sender column 310, representative of a sending computing element for a packet, receiver column 320, representative of a receiving computing element for a packet, protocol 330, representative of a protocol associated with the rule, and action 340, representative of an action to be taken based on the sender identifier, the receiver identifier, and the protocol identified in a packet. Sender column 310 and receiver column 320 may use MAC addressing, IP addressing, or some other identifier to determine source and destination information for a packet. For example, when a packet is identified for virtual node 122 to virtual node 123 that uses TCP as the communication protocol, the software defined networking elements may permit the communication, whereas a communication from virtual node 122 to virtual node 123 that uses UDP may be blocked by the software defined networking elements.

In generating connection tree 300, the management service may step through each of the various network forwarding rules to determine the available connections for each of the virtual nodes. In particular, when a connection is permitted between virtual nodes in a forwarding rule a new connection may be generated in the graph. Once the graph is generated, the management service may provide additional operations to assess the risk of threat propagation in the computing environment.

Figure 4A:
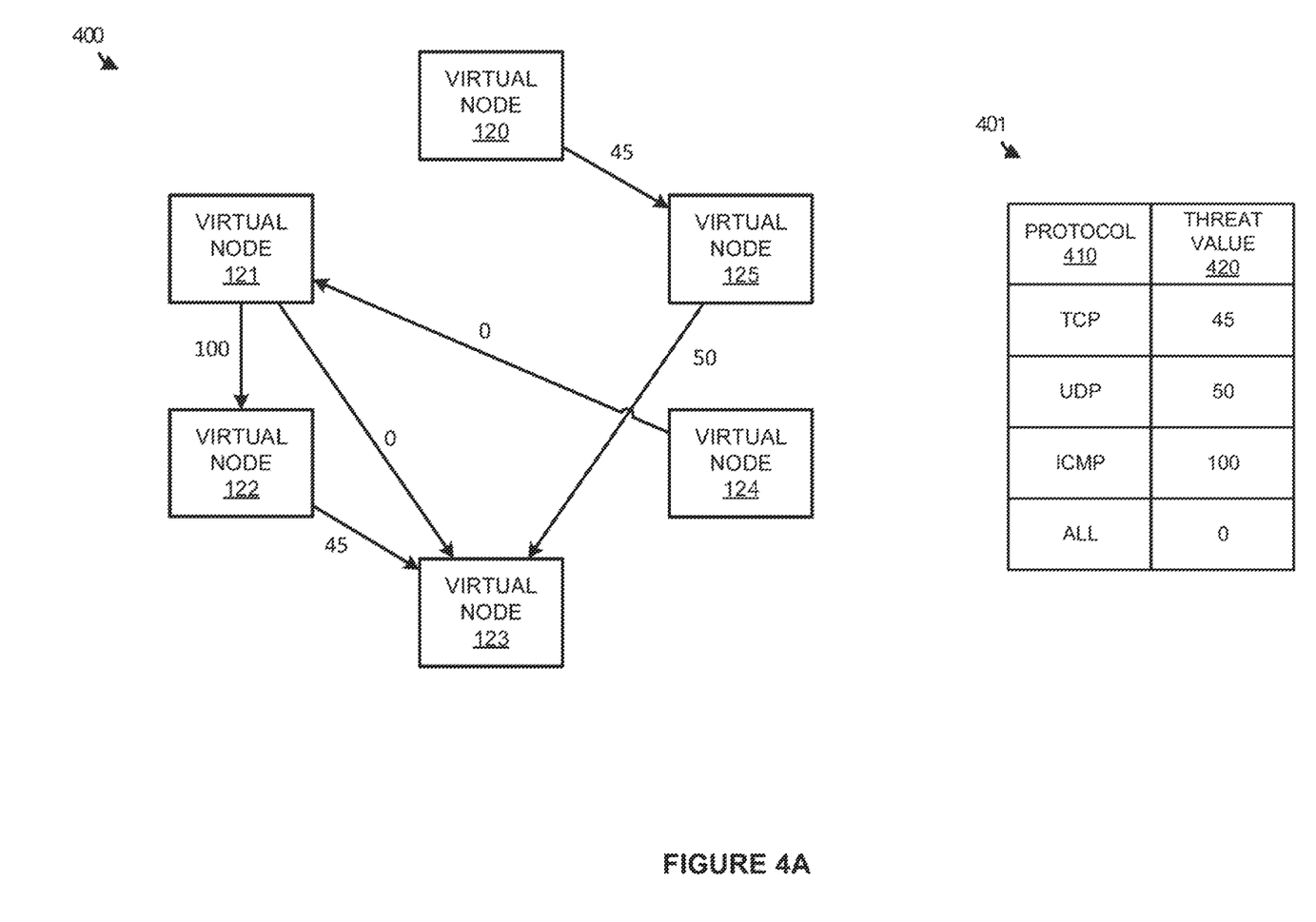
FIGS. 4A-4B illustrate an operational scenario of identifying risk assessment for a computing environment according to an implementation.
Figure 4B:
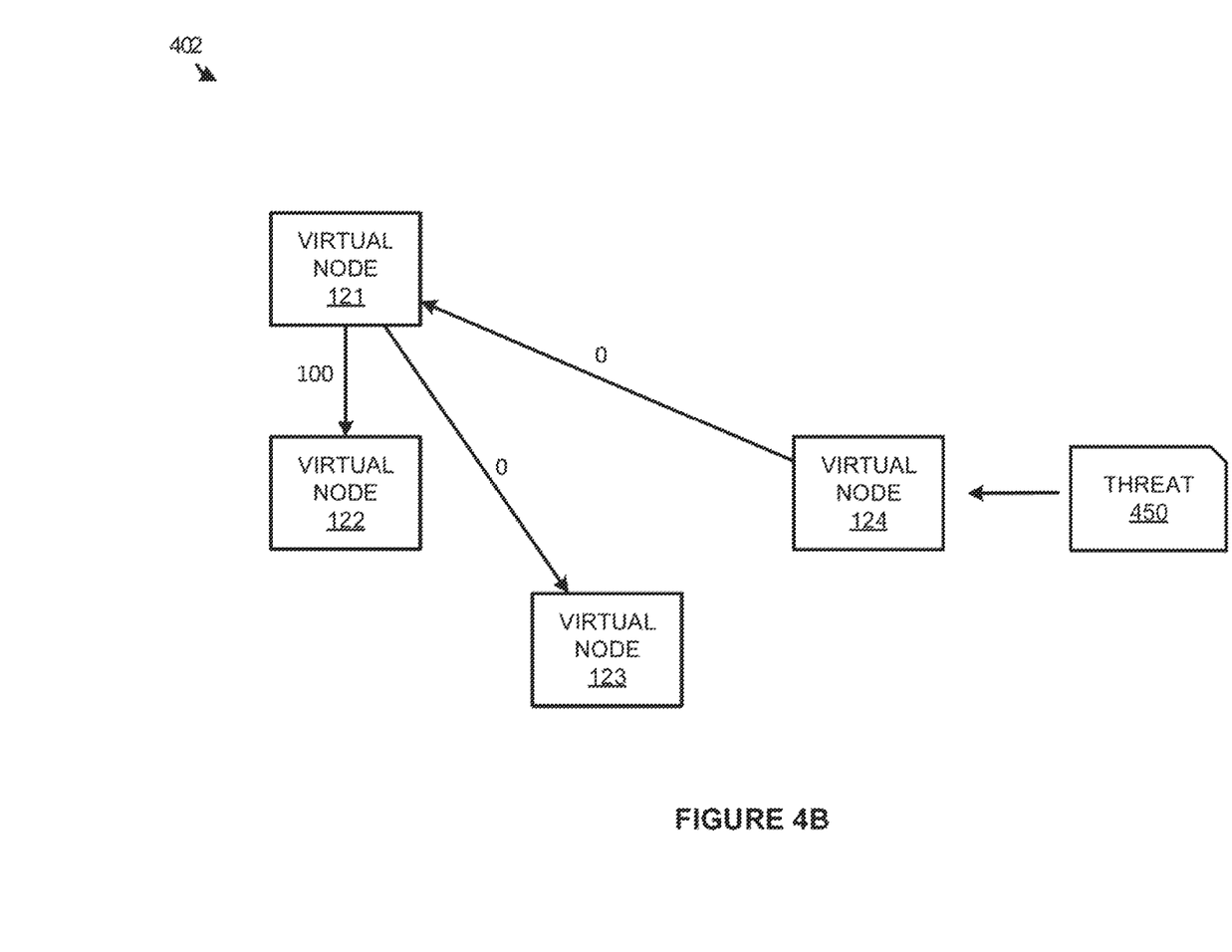

FIGS. 4A-4B illustrate an operational scenario of identifying risk assessment for a computing environment according to an implementation. FIG. 4A includes connection graph 400, wherein connection graph 400 include virtual nodes 120-125 from computing environment 100 of FIG. 1 and includes connection defined by data structure 301 of FIG. 3. FIG. 4A further includes data structure 401 that is used to associate protocols with different threat values and includes columns for protocols 410 and threat value 420. Although demonstrated with four protocols (including an inclusive "ALL" protocol), it should be understood that any number of protocols may be used in a computing environment. FIG. 4B further demonstrates a minimum spanning tree 402 for a threat 450 identified for the computing environment.

Referring first to FIG. 4A, once a connection tree is generated from forwarding rules associated with a computing environment, a monitoring service may further determine a threat value for each of the connections based at least on the protocol associated with the connection. Here, the computing environment uses four protocols that include TCP, UDP, ICMP, and ALL (any protocol), wherein each of the protocols in protocol 410 column correspond to a value in threat value 420 column. Thus, for each connection in connection graph 400, a value may be applied to the connection based on the protocol associated with the connection. In some implementations, the values may be generated based on user input, wherein the user may define the threat associated with the particular protocol. In other implementations, the values may be generated based on the size of the packets for the protocol, security measures implemented in the protocol, the quantity of data exchanged during each interaction, or some other factor. In some examples in addition to using the protocol for each of the connections, the management service may generate the threat values based on the types of data stored or accessible to the virtual nodes, the types of applications on the virtual nodes, or based on some other factor associated with the virtual nodes and the connection.

Once the threat values are identified for each of the connections in the computing environment, the management service may further generate minimum spanning trees for the virtual nodes based on the threat values and the connection tree. Turning to FIG. 4B, when threat 450 is identified for virtual node 124, a minimum spanning tree may be identified that has its root at virtual node 124. The minimum spanning tree may be used to identify the connections that have the greatest propagation threat in the computing environment. As an example, threat 450, which may be an actual threat or a hypothetical threat defined by an administrator associated with the environment, may be propagated to virtual node 123 from virtual node 121 directly or may be propagated from virtual node 121 to virtual node 123 using intermediary virtual node 122. In generating minimum spanning tree 402, the management service may determine that the route with the greatest threat to virtual node 123 is the direct route from virtual node 121 due to the corresponding threat value associated with the route. Using this example, the direct route has a threat value of zero based on the connection permitting any protocol from virtual node 121 to communicate with virtual node 123. In contrast, using the intermediary node, the connections required are ICMP and TCP, which would have a lower likelihood of the threat reaching virtual node 123. As a result, when determining the minimum spanning tree, the connection from virtual node 122 to virtual node 123 may be omitted as the most likely rout corresponds to the connection from virtual node 121 to virtual node 123.

From minimum spanning tree 402, the monitoring service may generate a threat propagation summary that can be provided to an administrator. This propagation summary may include trees, graphs, tables, or other data structures that can indicate the virtual nodes that could be affected by the propagation of a threat from the original virtual node. In some implementations, the summary may indicate all virtual nodes that the threat could be propagated to, however, the summary may only indicate virtual nodes of which the propagation risk meets propagation criteria. This criteria may be based on the threat values of the connections leading to the virtual node, may be based on the quantity of hops or total number of connections to the virtual node, or may be based on some other factor. In some implementations, the summary may provide a hierarchy or list that indicates the virtual nodes at the greatest propagation risk to the virtual nodes with the least propagation list. This hierarchy may be indicated using coloring, shading, or some other visual representation when the summary includes a graph, tree, or some other data structure. Additionally, the hierarchy may be based on the risk values assessed to the connections to the originating virtual node.

In some implementations, the summary may be generated at the request of an administrator or user associated with the computing environment. For example, an administrator may indicate a real or hypothetical malware application associated with a particular virtual node in the computing environment. In response to the administrator specification, the management service may identify virtual nodes relevant to the propagation of the malware based on the minimum spanning trees and generate a summary of the relevant nodes. In other examples, the summary may be generated automatically when a threat is identified in the computing environment, and the summary may be provided to an administrator as an email, text message, or some other application notification to indicate the propagation summary associated with the threat.

In some examples, in addition to, or in place of, generating a summary that visually represents the propagation of a threat in a computing environment, the management service may use the minimum spanning trees to identify actions to be used in responding to the threat. These actions may include changing the forwarding rules of the computing environment, stopping the operation of specific virtual nodes, placing virtual nodes in a private network, or providing some other operation with respect to virtual nodes identified as possible propagation points for the threat. Additionally, suggestions may be provided by the management service to an administrator indicating that one or more actions should be taken with respect to the virtual nodes that correspond to propagation points or virtual nodes for the threat.

Figure 5:
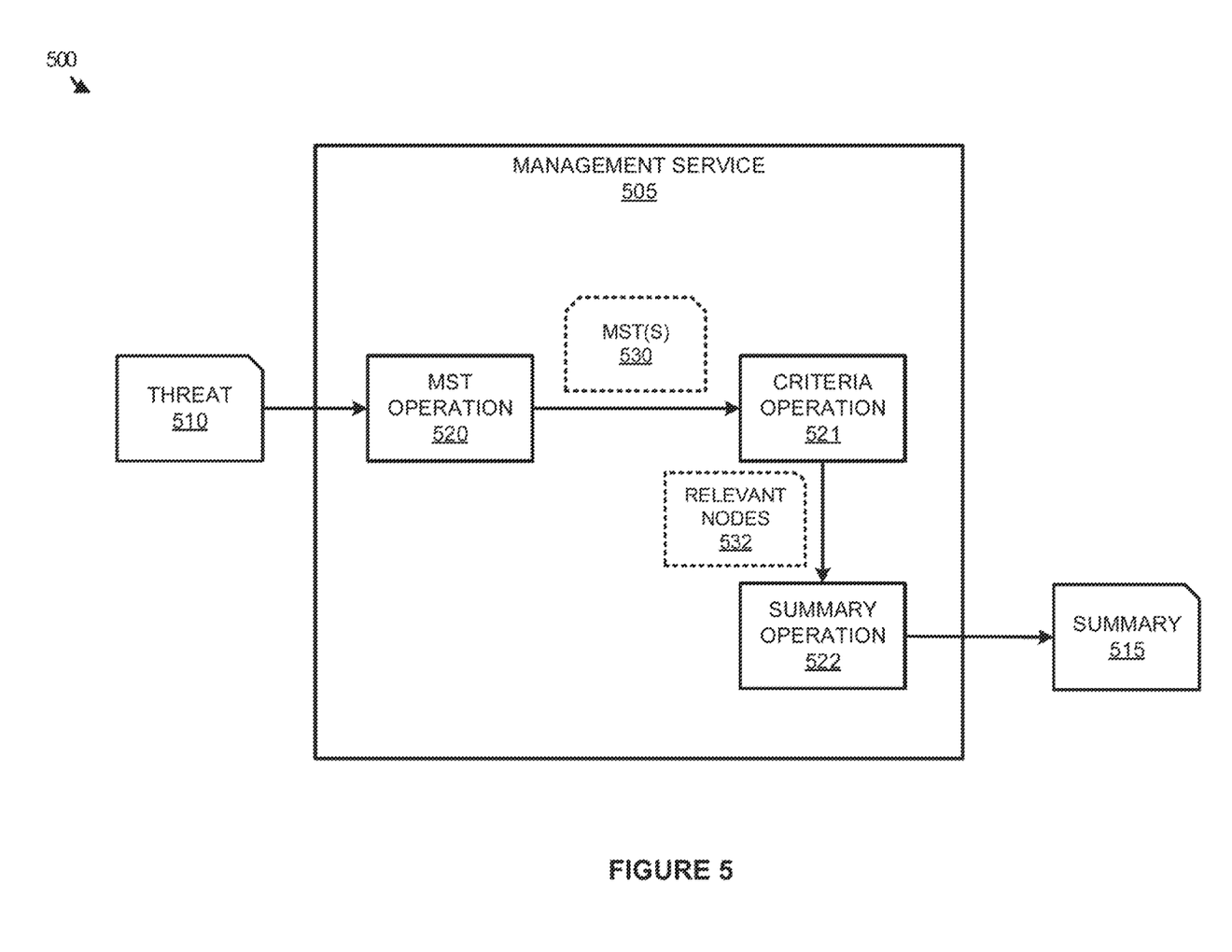
FIG. 5 illustrates an operational scenario of identifying risk assessment for virtual nodes in response to a threat according to an implementation.

FIG. 5 illustrates an operational scenario 500 of identifying risk assessment for virtual nodes in response to a threat according to an implementation. Operational scenario 500 includes threat 510, management service 505, and summary 515. Management service 505 provides operations 520-522, wherein operations 520-522 generate and use minimum spanning tree(s) 530 or MST(s) and relevant nodes 532.

In operation, management service 505 obtains a notification for threat 510, wherein threat 510 corresponds to malware, spyware, or some other malicious process on a first virtual node of a computing environment. In response to identifying threat 510, minimum spanning tree operation 520 may identify at least one minimum spanning tree that corresponds to the threat and provide the at least one minimum spanning tree to criteria operation 521. The minimum spanning tree may be used to indicate the highest risk routes for a threat to be propagated to other virtual nodes in the computing environment.

Once received, criteria operation 521 may determine relevant nodes 532 that are relevant to a summary of threat 510. In some implementations, criteria operation 521 may identify a subset of the virtual nodes that are in a minimum spanning tree for the threat based on propagation criteria. This criteria may include a maximum value for the sum of threat values, a total number of next hops (virtual nodes in a sequence) to exchange the threat, or some other criteria. For example, a minimum spanning tree from minimum spanning tree operation 520 may indicate that a threat can be propagated to thirty nodes from a first node, however, criteria node 521 may determine that only ten of the nodes satisfy criteria of being at risk of propagation of the threat.

Once relevant nodes 532 are determined, summary operation 522 may generate summary 515 that demonstrates the propagation risk for nodes associated with threat 510. The summary may comprise a user interface that indicates a graph, tree, database, list, or other data structure that corresponds to the relevant nodes 532. In some examples, summary 515 may indicate a hierarchy of virtual nodes that corresponds to the most likely virtual nodes to obtain the threat or be affected by the threat to the virtual nodes that are least likely to be affected by the threat. The hierarchy may be based at least in part on the threat values associated with the available connections to the virtual nodes.

In some implementations, threat 510 may be defined by an administrator and may correspond to a real or hypothetical threat for the computing environment. In other implementations, the threat may be identified by the hosts or virtual nodes of the computing environment and supplied by the hosts or virtual nodes to management service 505.

Although demonstrated in the example of FIG. 5 as providing a summary to an administrator of the computing environment, it should be understood that similar operations may be used to respond to the incident. For example, an operation of management service 505 may identify one or more virtual nodes that satisfy risk criteria as the most likely to be affected by a threat. Once the one or more virtual nodes are identified, an action may be implemented to respond to the threat, wherein the action may include implementing new forwarding rules, generating a new network for the one or more virtual nodes, or providing some other operation. Additionally, the actions to respond to the threat may be provided to an administrator in some examples, permitting the administrator to initiate a response to the threat.

Figure 6:
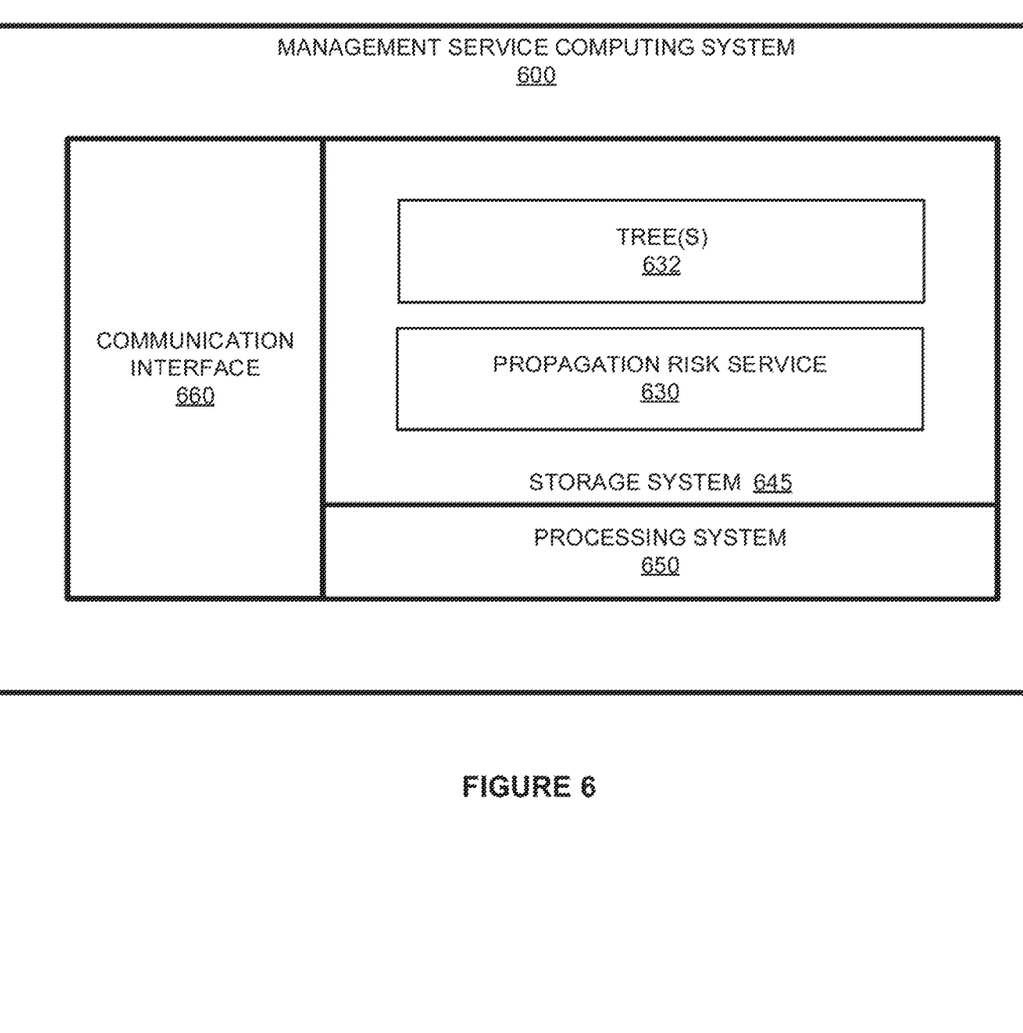
FIG. 6 illustrates a management service computing system for a computing environment according to an implementation.

FIG. 6 illustrates a management service computing system 600 for a computing environment according to an implementation. Computing system 600 is representative of any computing system or systems with which the various operational architectures, processes, scenarios, and sequences disclosed herein for a management service can be implemented. Computing system 600 is an example of management service 150 of FIG. 1, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with one or more host computing elements or other computing systems associated with a computing environment that provide network connectivity for virtual nodes.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises propagation risk service 630 capable of providing at least operation 200 of FIG. 2, which may further generate and use tree(s) 632. The operating software on storage system 645 may further include an operating system, utilities, drivers, network interfaces, applications, or some other type of software. When read and executed by processing system 650 the operating software on storage system 645 directs computing system 600 to operate as described herein.

In at least one implementation, propagation risk service 632 may direct processing system 650 to identify a connection tree for a computing environment based on forwarding rules for virtual nodes in the computing environment. Propagation risk service 632 may further determine a threat value for each connection in the connection tree based at least on a protocol associated with the connection. Once the threat values are determined, propagation risk service 632 may identify a threat to a virtual node of the virtual nodes and generate a threat propagation summary for the threat based on the threat values for the connections in the connection tree. In some implementations, the threat propagation summary may be based at least in part on minimum or maximum spanning trees for the virtual nodes that are generated using the threat values.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   identifying a connection tree for a computing environment based on forwarding rules for packets associated with virtual nodes in the computing environment, wherein the connection tree indicates at least a plurality of connections between the virtual nodes;
   for each connection in the connection tree, determining a threat value based at least on a protocol associated with the connection;
   calculating one or more minimum or maximum spanning trees for the virtual nodes based on the threat values and the connection tree; and
   generating a threat propagation summary based on the one or more minimum or maximum spanning trees.

2. The method of claim 1, wherein determining the threat value based at least on the protocol associated with the connection comprises determining the threat value based at least on packet size associated with the protocol and security measures implemented by the protocol.

3. The method of claim 1 further comprising:
obtaining a request for the threat propagation summary; and
wherein generating the threat propagation summary occurs in response to the request.

4. The method of claim 1 further comprising:
identifying a virtual node of the virtual nodes associated with a threat; and
wherein the threat propagation summary indicates one or more virtual nodes of the virtual nodes with connections to the virtual node.

5. The method of claim 4, wherein the threat comprises malware executing on the virtual node.

6. The method of claim 1 further comprising:
identifying a virtual node of the virtual nodes associated with a threat; and
identifying one or more virtual nodes of the virtual nodes that satisfy propagation criteria based on the one or more minimum or maximum spanning trees; and
wherein the threat propagation summary indicates the one or more virtual nodes of the virtual nodes with connections to the virtual node.

7. The method of claim 1, wherein determining the threat value is further based on data stored on virtual nodes associated with the connection or applications executing on virtual nodes associated with the connection.

8. The method of claim 1 further comprising:
identifying a virtual node of the virtual nodes associated with a threat; and
wherein generating the threat propagation summary comprises generating an interface that indicates a propagation threat hierarchy to one or more other virtual nodes of the virtual nodes in the computing environment.

9. A computing system comprising:
a storage system;
a processing system operatively coupled to the storage system; and
program instructions stored on the storage system that, when executed by the processing, direct the processing system to:
identify a connection tree for a computing environment based on forwarding rules for packets associated with virtual nodes in the computing environment, wherein the connection tree indicates at least a plurality of connections between the virtual nodes;
for each connection in the connection tree, determine a threat value based at least on a protocol associated with the connection;
calculate one or more minimum or maximum spanning trees for the virtual nodes based on the threat values and the connection tree; and
generate a threat propagation summary based on the one or more minimum or maximum spanning trees.

10. The computing system of claim 9, wherein determining the threat value based at least on the protocol associated with the connection comprises determining the threat value based at least on packet size associated with the protocol and security measures implemented by the protocol.

11. The computing system of claim 9, wherein the program instructions further direct the processing system to:
obtain a request for the threat propagation summary; and
wherein generating the threat propagation summary occurs in response to the request.

12. The computing system of claim 9, wherein the program instructions further direct the processing system to:
identify a virtual node of the virtual nodes associated with a threat; and
wherein the threat propagation summary indicates one or more virtual nodes of the virtual nodes with connections to the virtual node.

13. The computing system of claim 12, wherein the threat comprises malware executing on the virtual node.

14. The computing system of claim 9, wherein the program instructions further direct the processing system to:
identify a virtual node of the virtual nodes associated with a threat; and
identify one or more virtual nodes of the virtual nodes that satisfy propagation criteria based on the one or more minimum or maximum spanning trees; and
wherein the threat propagation summary indicates the one or more virtual nodes of the virtual nodes with connections to the virtual node.

15. The computing system claim 9, wherein determining the threat value is further based on data stored on virtual nodes associated with the connection or applications executing on virtual nodes associated with the connection.

16. The computing system of claim 9, wherein the program instructions further direct the processing system to:
identify a virtual node of the virtual nodes associated with a threat; and
wherein generating the threat propagation summary comprises generating an interface that indicates a propagation threat hierarchy to one or more other virtual nodes of the virtual nodes in the computing environment.

17. A computing system comprising:
a storage system;
program instructions stored on the storage system that, when executed by a processing system, direct the processing system to:
identify a connection tree for a computing environment based on forwarding rules for virtual nodes in the computing environment, wherein the connection tree comprises a plurality of connections between the virtual nodes;
for each connection in the connection tree, determine a threat value based at least on a protocol associated with the connection;
identify a threat to a virtual node of the virtual nodes; and
generate a threat propagation summary for the threat based on the threat values for the connections in the connection tree.

18. The computing system of claim 17, wherein determining the threat value based at least on the protocol associated with the connection comprises determining the threat value based at least on packet size associated with the protocol and security measures implemented by the protocol.

19. The computing system of claim 17, wherein the threat comprises malware executing on the virtual node.

20. The computing system of claim 17, wherein the program instructions further direct the processing system to:
identify one or more virtual nodes that satisfy propagation criteria from the virtual node based on the threat values; and
wherein generating the threat propagation summary comprises generating an interface that indicates a propagation threat hierarchy to the one or more other virtual nodes of the virtual nodes in the computing environment.

* * * * *